United States Patent [19]

Schwab, Jr. et al.

[11] E Patent Number: Re. 33,614

[45] Reissued Date of Patent: Jun. 18, 1991

[54] APPARATUS AND METHOD FOR ENHANCED OIL RECOVERY

[75] Inventors: Carl M. Schwab, Jr., Bakersfield; Clark E. Robison; James B. Renfroe, Jr., both of Valencia, all of Calif.

[73] Assignee: Otis Engineering Corp., Dallas, Tex.

[21] Appl. No.: 793,842

[22] Filed: Nov. 25, 1987

Related U.S. Patent Documents

Reissue of:

[64] Patent No.: 4,646,828
Issued: Mar. 3, 1987
Appl. No.: 793,842
Filed: Nov. 1, 1985

[51] Int. Cl.[5] ..... E21B 43/24

[52] U.S. Cl. ..... 166/303; 166/67; 166/117.5; 166/380; 166/386; 166/269

[58] Field of Search ..... 166/117.5, 117.6, 227, 166/242, 303, 380, 386, 57, 67, 272, 269, 316, 319, 305.1

[56] References Cited

U.S. PATENT DOCUMENTS

| | | | |
|---|---|---|---|
| 129,025 | 7/1872 | Harris | 166/227 |
| 572,848 | 12/1896 | Wheeler | 166/227 |
| 3,455,382 | 7/1969 | Chenoweth | 166/269 |
| 4,295,796 | 10/1981 | Moore | 166/117.5 |
| 4,462,465 | 7/1984 | Strickland | 166/117.5 |

*Primary Examiner*—Stephen J. Novosad
*Attorney, Agent, or Firm*—M. H. Gay

[57] ABSTRACT

An impingement device in a side pocket mandrel or other downhole tools for injecting a predetermined quality of steam in one or more zones of a formation. The impingement device directs and mixes the laminae of hot fluid and vapor and a valve in a valve pocket controls the flow of steam to the zone from the side pocket mandrel or other downhole tools. Along with the impingement device, a centralizer to guide tools through the impingement device and to cause a pressure change and dispersion of the steam; and an agitation device to amalgamate the steam may be used if further blending is required.

58 Claims, 4 Drawing Sheets

APPARATUS AND METHOD FOR ENHANCED OIL RECOVERY

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to injecting one or more phases of steam into one or more formations from a single string of tubing by utilizing an impingement means in a side pocket mandrel or other downhole tools and including, if desired, an agitation device to control the quality and flow of steam. The invention may also include a centralizer to guide a tool string and disperse the steam.

2. Description of Related Art

In the past, various configurations of devices were used to inject steam and other fluids and gases into one or more zones of a formation to enhance hydrocarbon recovery, such as oil, from the earth. Depending on the medium injected and the properties of the formation, some of these devices were more successful than others.

Early injection techniques usually involved drilling a hole for each formation zone in a selected area. This horizontal expansion method of enhanced recovery is extremely expensive and time-consuming. A more economical method would entail servicing the various zones in a formation by way of multiple injection points in a single drilled hole.

A related patent, U.S. Pat. No. 4,248,302, answering the need for multiple zone injection from a single drilled hole was granted to Ronald K. Churchman and was assigned to Otis Engineering Corporation. Although particularly addressing pumpdown (through the flow line) completions, the patent does show using one or more side pocket mandrels to inject fluids and steam into one or more wells and/or formation zones. This method and apparatus was an advancement in the field of steam injection.

As interest in injection increased, several zones in a formation were serviced from a single drilled hole by utilizing concentric tubing. Such a configuration is shown in U.S. Pat. No. 3,319,717 by D. V. Chenoweth, U.S. Pat. Nos. 4,081,032, 4,099,563 and 4,399,865 by S. O. Hutchinson and G. W. Anderson and U.S. Pat. No. 4,081,028 by E. E. Rogers. All these devices allow steam or hot fluids to flow through the inner tubing to the next distributing apparatus while providing a passage for the steam or hot fluids to flow into the casing-tubing annulus and into a selected zone. While an improvement on multiwells, these devices did not allow the operator to deliver a calculated percentage of steam and hot fluid to a particular zone nor did they control the quality of the steam at several points in the well bore. Also the operator could not run maintenance tools down the tubing string to rework the downhole devices. Testing of this type of device showed that heat transfer between the concentric tubes created a heat loss from one tube to the other and created undesirable tubing movement. Chenoweth's U.S. Pat. No. 3,319,717 device was retrievable but had to be removed from the tubing string before any survey or maintenance tools could be run below the device. Oilfield operators wanted a system more controllable and more easily maintained.

U.S. Pat. No. 3,455,382 by D. V. Chenoweth solved part of the maintenance problem by injecting into different zones with a pressure regulator placed in a side pocket material. Tools to service the downhole devices could then be passed by the pressure regulators without removing them. The function of the pressure regulators was to keep the single phase injection fluids going through the exit port in the side pocket mandrel and into the tubing-casing annulus at a constant rate regardless of tubing pressure upstream or downstream of the pressure regulator. However, Chenoweth's device did not address the problem of providing a desired percentage of vapor and hot fluids to one or more separate formation zones. This device did not, because of its throttle-like action, allow the user to calculate a critical flow relationship utilizing known input pressures of injected fluid or steam. The present invention does allow the user to calculate a critical flow relationship and also has the advantage of having no moving parts.

SUMMARY OF THE INVENTION

The present invention includes an impingement means and other means within the flow passageway of a side pocket mandrel or other downhole tools to mix and direct the flow of steam and inject the steam into the formation. Steam is defined throughout this application to mean vapor and hot fluid or any combination thereof unless addressed separately as hot fluid or vapor. The steam is used to aid in the recovery of viscous petroleums, usually on the order of one to 1,000,000 centipoise at reservoir temperatures, by heating the petroleum with the steam.

The side pocket mandrel or other downhole tool is connected to a source of pressurized steam. The steam is pumped under pressure to the side pocket mandrel or other downhole tools through flow conductors. The steam as it leaves the source is mostly of a vaporous nature. As it travels through the flow conductors, it has a tendency to separate into a combination of vapor and hot fluid. A portion of this hot fluid including some vapor clings to the wall of the flow conductor in a more or less laminar manner while the remaining vapor continues down the center of the flow conductors.

In order to recombine the vapor and the hot fluid into a desired percentage of each, the impingement means mixes the two phases. This is accomplished in a chamber formed between the impingement means and the wall of the longitudinal flow passageway of the side pocket mandrel or other downhole tools. Primarily, hot fluid enters the grooves of the impingement means and is directed through the chamber formed by the impingement means and the wall of the longitudinal flow passageway of the side pocket mandrel body or other downhole tools by way of the radial directing means which in the preferred embodiment is a spirally-cut set of lands and grooves. The vapor phase of the steam flows into and is deflected by the fingers of the impingement means into the longitudinal flow passageway of the impingement means. These fingers also serve to guide tools through the impingement means. One or more holes through the wall in the impingement means allow the vapor to enter grooves formed on the outside diameter of the impingement means and the chamber formed between the outside diameter of the impingement means and the wall of the longitudinal flow pasgeway of the side pocket mandrel body or other ›wnhole tools.

After mixing a percentage of the steam enters a value eans which regulates the flow of steam into the tub-g-casing annulus and into the formation zone through ıe perforations or flows out through drain holes in the ıpingement means to continue down toward other ownhole equipment. The valve means could be, mong other devices, a choke means. In the preferred mbodiment, an offset choke means referred to as a alve means is used. Vapor and hot fluid that did not nter the chamber, as described above, flow through he longitudinal flow passageway and on to other lownhole equipment.

The present device injects a preferred percentage of ıot fluid and vapor into the formation zones at prese-ected intervals thus warming the viscous petroleum ınd enhancing its flow characteristics.

The impingement means can be placed in a downhole :ool, other than a side pocket mandrel, that has a longi-:udinal flow passageway in which to place it. Flow of hot water and vapor could then be diverted percentage-wise by the impingement means into the ports provided in the downhole tool or on through the longitudinal flow passageway to other downhole equipment.

It is therefore one object of the present invention to provide an apparatus for enhanced oil recovery by steam injection.

It is a further object of this invention to provide an impingement means and, if desired, an agitation means in a side pocket mandrel or other downhole tools to inject a controlled percentage of hot fluid and vapor into a formation zone.

It is another object of this invention to agitate and recombine multiphased steam flow in a side pocket mandrel or other downhole tools using an impingement means and, in selected embodiments, an agitation means and/or a centralizer means.

It is yet another object of this invention to provide a centralizer means or an agitation means in a side pocket mandrel or other downhole tools that will also guide tools through the impingement means.

DESCRIPTION OF THE PREFERRED EMBODIMENT

Figure 1A:
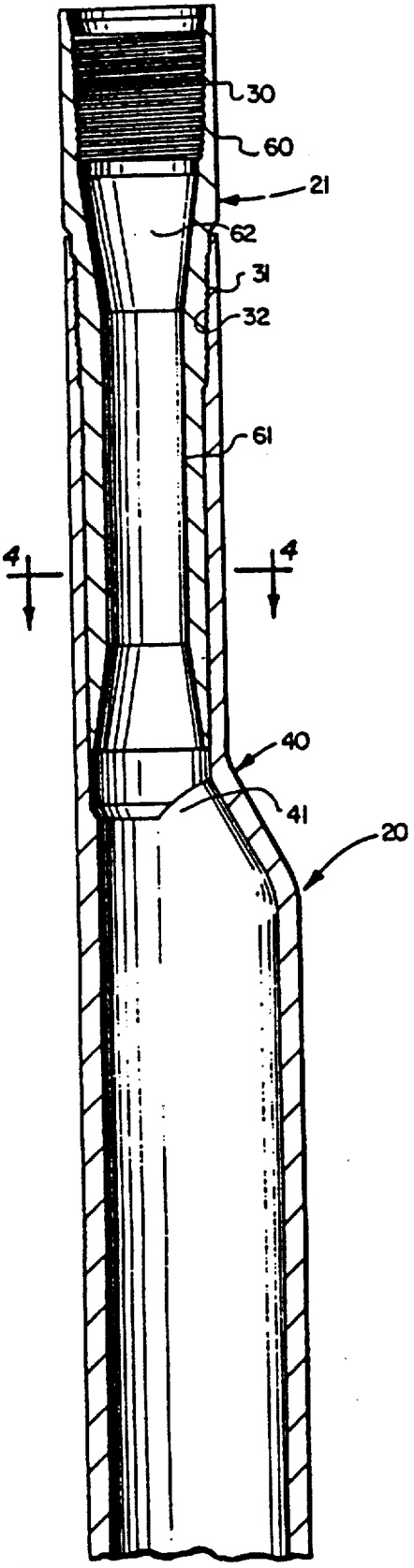
FIGS. 1A and 1B taken together constitute a longitudinal view, in section, showing the side pocket mandrel with a centralizer means, an impingement means and a valve means.
Figure 1B:
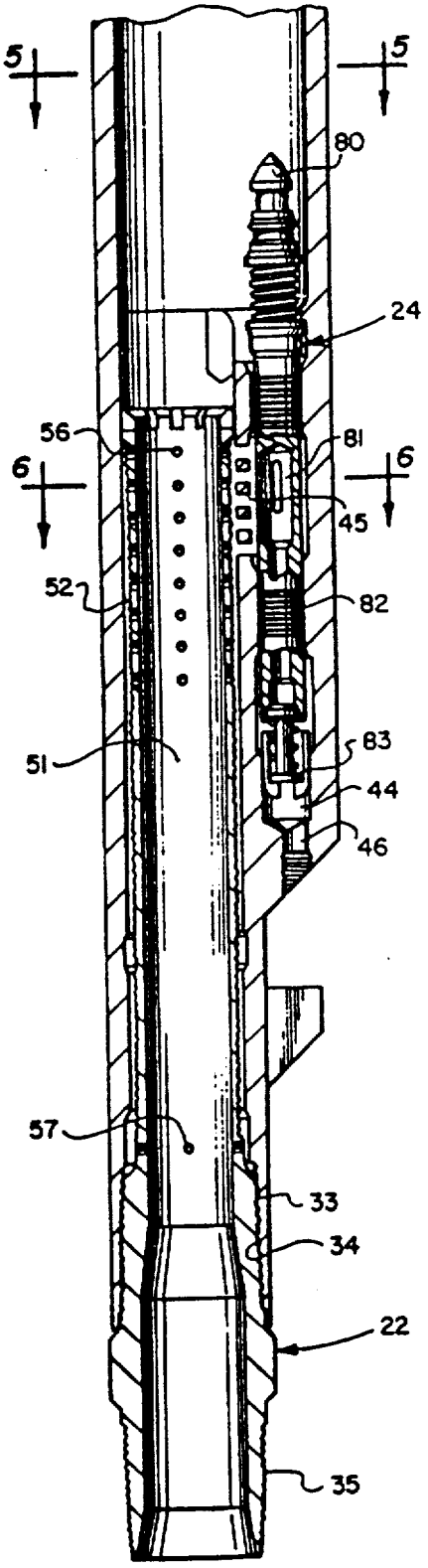
Figure 8:
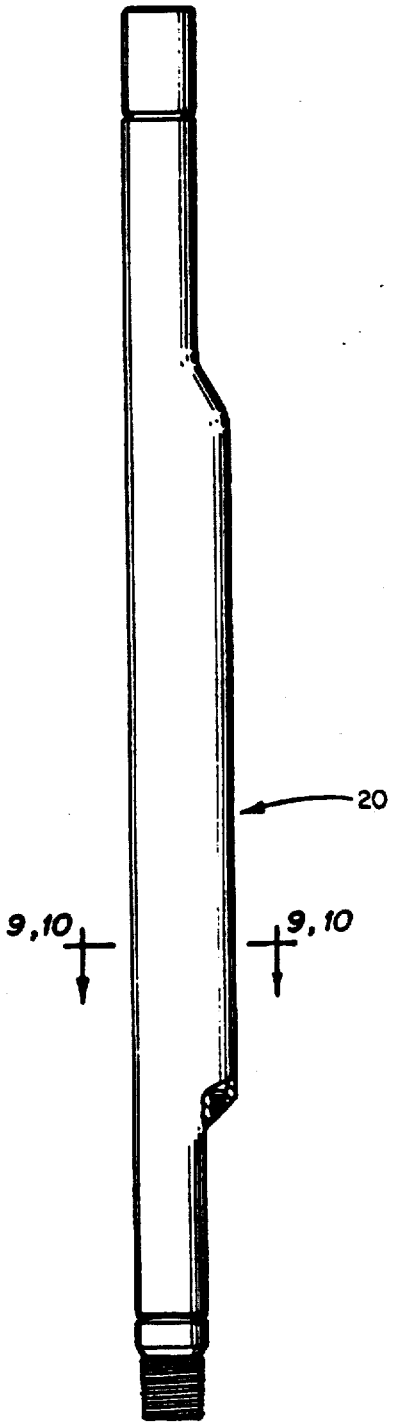
FIG. 8 is a longitudinal view, partly in section and partly in elevation, showing a side pocket mandrel of a different design than that shown in FIGS. 1A and 1B.
Figure 9:
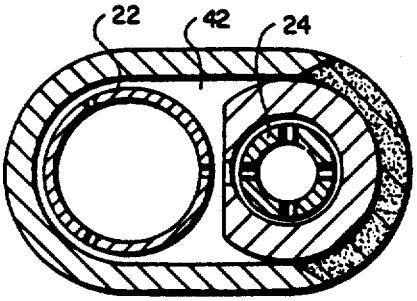
FIG. 9 is a cross-sectional view taken along line 9—9 of FIG. 8 showing an oval or eliptical shaped mandrel configuration and the chamber formed between the outside diameter of an impingement means and the wall of the longitudinal flow passageway of this design side pocket mandrel.
Figure 10:
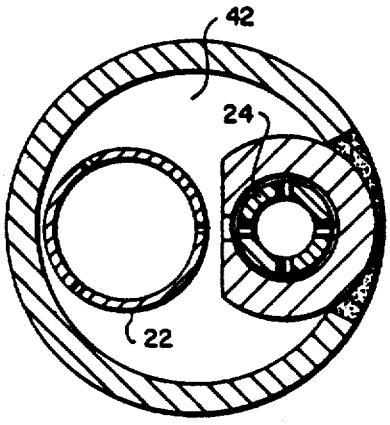
FIG. 10 is a cross-sectional view taken along line 10—10 of FIG. 8 showing a round shaped mandrel configuration and the chamber formed between the outside diameter of an impingement means and the wall of the longitudinal flow passageway of this design side pocket mandrel.

Referring to FIGS. 1A and 1B, the side pocket mandrel 20 may have various round or nonround cross-sectional shapes. Although many cross-sectional configurations are available to one skilled in the art of side pocket mandrel design, the shapes most used are round, oval and elliptical. Two of these shapes are shown in FIGS. 9 and 10 which are examples of possible cross-sections of the side pocket mandrel shown in FIG. 8.

An upper crossover sub (not shown) with threads compatible with upper side pocket mandrel body thread 31 may be used to connect the crossover sub to the side pocket mandrel 40 if centralizer means 21 is not used. The crossover sub would also contain a thread similar to upper centralizer means thread 30 that would connect side pocket mandrel 20, by means of the upper crossover sub, to a source of pressurized steam (not shown).

As shown in FIGS. 1A and 1B, the centralizer means 21 is connected at one end to a source of pressurized steam by upper centralizer means thread 30 and is connected to one end of the side pocket mandrel body 40 by lower centralizer means thread 32 which is mated to upper side pocket mandrel body thread 31. This is another example of possible means to connect side pocket means 20 to a source of pressurized steam. The impingement means 22 is connected to the other end of the side pocket mandrel body 40 by the upper impingement means thread 34 mated with lower side pocket mandrel body thread 33. The lower impingement means thread 35 and thereby side pocket mandrel 20 can be connected to other downhole well equipment (not shown). One skilled in the art would realize that other connecting methods other than threads could be used.

Pressurized steam enters the centralizer means 21. Centralizer means 21 contains a second mandrel means 60 having a third longitudinal flow passageway 63 therethrough. The third longitudinal flow passageway 62, through which the steam flows, has its inner diameter reduced to form the venturi means 61 as shown in FIG. 1A. The venturi means 61 serves at least two functions. It provides for guidance of tools through the side pocket mandrel 20 and causes a pressure change and dispersion of the steam that passes through the venturi means 61.

The steam then enters side pocket mandrel body 40 by way of the first longitudinal flow passageway 41. As the steam flows from its source, it tends to form laminae (not shown) of various combinations of vapor and hot fluid. The recombination or remixing of the various phases and laminae of the steam is further accomplished by impingement means 22.

Figure 2:
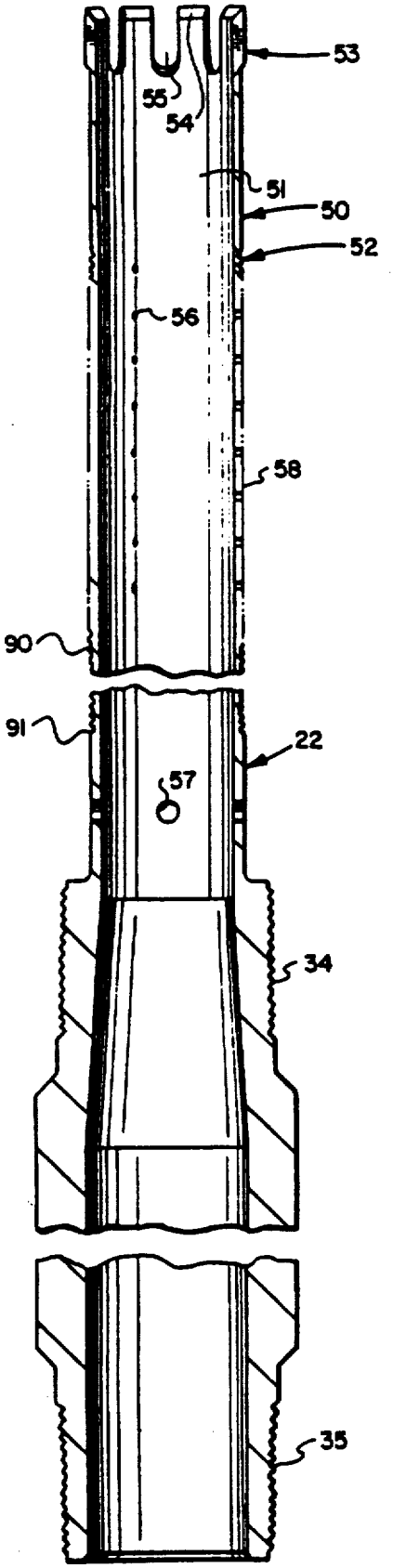
FIG. 2 is a longitudinal view, in section, showing an impingement means constructed in accordance with the present invention.
Figure 3:
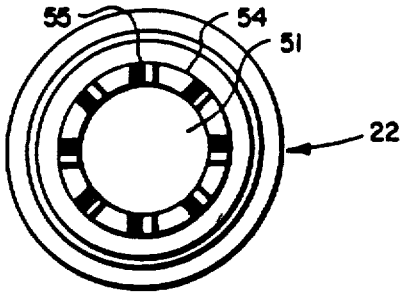
FIG. 3 is a top view of FIG. 2.
Figure 4:
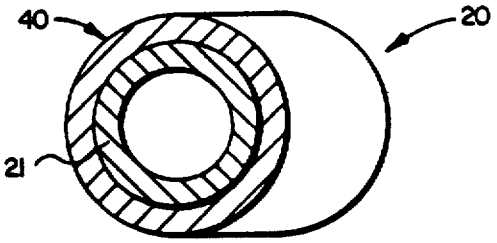
FIG. 4 is a cross-sectional view taken along line 4—4 of FIG. 1A showing a centralizer means located in the side pocket mandrel.
Figure 5:
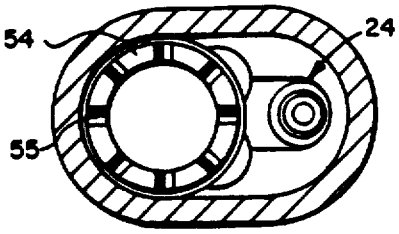
FIG. 5 is a cross-sectional view taken along line 5—5 of FIG. 1B showing the top view of an impingement means and a valve means seated in its pocket in the side pocket mandrel. The chamber formed between the outside diameter of an impingement means and the wall of the longitudinal flow passageway of the side pocket mandrel is also shown.
Figure 6:
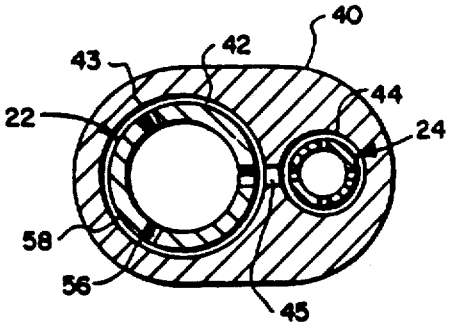
FIG. 6 is a cross-sectional view taken along line 6—6 of FIG. 1B showing the relationship of a port means, shown as holes, in the wall of an impringement means and the ports in the valve means in the valve pocket.

The impingement means 22 is shown in place in side pocket mandrel 20 in FIG. 1B, in an enlarged view in FIG. 2 and is shown in a top view in FIG. 3. The impingement means 22 includes a first mandrel means 50 having a second longitudinal flow passageway 51 therethrough and a helical directing means 52 which, in the preferred embodiment, is a set of spirally cut lands 91 and grooves 92 formed on the outside diameter 58 of the first mandrel means 50. The helical directing means 52 could be a set of threads of which several different configurations are available. Also included in the impingement means 22 is longitudinal directing means 53 which includes alternating fingers 54 and slots 55 on one end of the first mandrel means 50. In FIG. 2, a second port means 56, shown as holes through the wall of the first mandrel means 50, allows communication of steam between the second longitudinal flow passageway 51 and the first longitudinal flow passageway 41. Referring to FIGS. 5 and 6, the impingement means 22 also includes a third port means 57 for draining steam from the chamber 42 formed between the wall of the first longitudinal flow passageway 41 and the outer diameter 58 of the first mandrel means 50. The steam from chamber 42 flows back into second longitudinal flow passageway 51 of first mandrel means 50 through third port means 57 and out of side pocket mandrel 20.

As the laminae of hot fluid and vapor form of the surfaces of the equipment above impingement means 22, vapor also flows as a more or less separate phase down through the center of the longitudinal flow passageways. The laminae of hot fluid and vapor strike the fingers 54 and the slots 55 of the longitudinal directing means 53. The laminae of hot fluid and vapor are diverted or directed through slots 55 into chamber 42 and into the spirally cut lands 90 and grooves 91 of the helical directing means 52. As the vapor phase of the steam enters the second longitudinal flow passageway 51, part of the vapor enters chamber 42 and helical directing means 52 by way of the second port means 56. Part of the vapor is deflected into the second longitudinal flow passageway 51 by fingers 54 and continues to flow out of the side pocket mandrel 20 through the second longitudinal flow passageway 51 of impingement means 22.

As the laminae of hot fluid and vapor are directed helically around impingement means 22 and through chamber 42 by the helical directing means 52, the laminae meet and are mixed with the vapor phase of the steam entering the helical directing means 52 and the chamber 42 through second port means 56.

The shape, number and configuration of the fingers 54 and slots 55 of the longitudinal directing means 53; the size of the chamber 42; the number, location and size of second port means 56; the size and configuration of the lands 91 and grooves 92 of helical directing means 52; the size of first mandrel means 50; and the size, number and location of third port means 57 affect the quality or percentage of hot fluid to vapor that is mixed in chamber 42 and enters the fourth port means 45 once the hot fluid and vapor reaches the impingement means 22.

Communication from chamber 42 to valve pocket 44 is accomplished by the steam passing through fourth port means 45. The amount of steam entering first port means 46 is controlled by valve means 24 located in valve pocket 44.

Valve means 24 is comprised mainly of latch means 80, control means 81, seal means 82 and flow direction means 83. Latch means 80 allows for placement, removal and replacement of the valve means 24 by downhole wireline tools (not shown) familiar to those skilled in the art of placing and retrieving equipment with standard latch means. Valve means 24 is similar in construction to the chemical injection valve shown on page 6238 of the Otis Engineering Corporation section of the 1984–85 Edition of The World Oil Composite Catalog. The seal means 82 and the flow direction means 83 prevent the steam from entering the valve pocket 44 by any other path other than fourth port means 45 or leaving by any other path than first port means 46 by way of flow direction means 83. Flow direction means 83 can by a one-way valve to allow flow of steam in only one direction. Valve means 24 can be installed without flow direction means 83. First port means 46 could be fitted with a means to direct the flow of steam or with a venturi means to expand and dispense the steam. The steam is now able to enter the formation after passing through the perforations (not shown).

Other factors influencing the percentage or quality of the steam arriving at the first port means 46 include the quantity and quality (percentage of hot fluid to vapor) available at the side pocket mandrel 20 and the influences equipment above impingement means 22 has on the steam. In alternative embodiments of the invention, a centralizer means 21 and/or an agitation means 23 are utilized in the side pocket mandrel 20.

Figure 7:
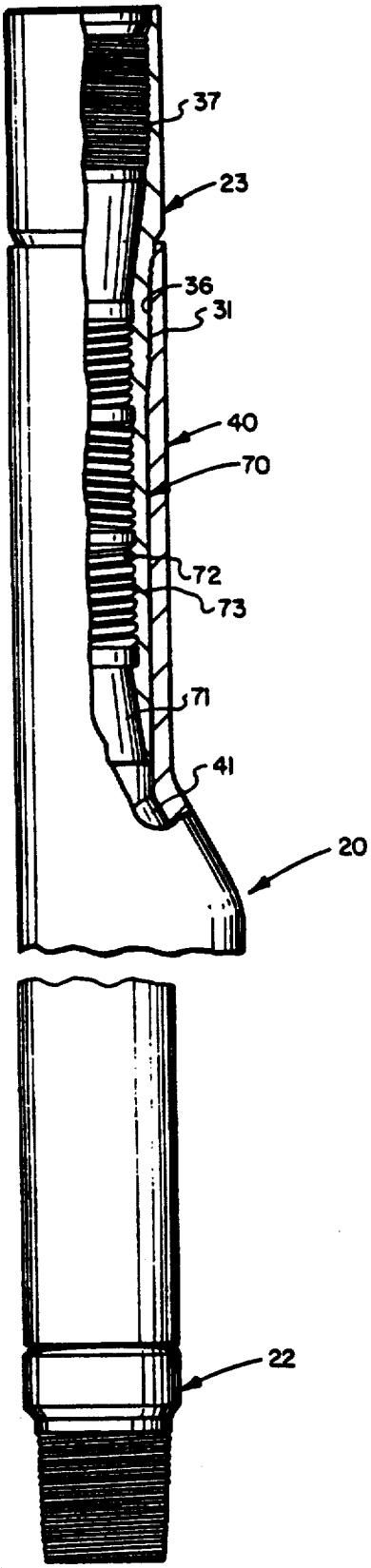
FIG. 7 is a longitudinal view, partly in section and partly in elevation, showing an agitation means as placed in an alternate embodiment of the invention.

The centralizer means 21, previously discussed, may be placed in the side pocket mandrel body 40 in lieu of a crossover sub (not shown). The agitation means 23 can also be placed in the same location in the side pocket mandrel body 40 just as was the centralizer means 21. One of the alternative embodiments showing the agitation means 23 in place is shown in FIG. 7. Another alternative embodiment showing the agitation means 123 is shown in FIG. 11.

Referring to FIG. 7, agitation means 23 is comprised mainly of third mandrel means 70, fourth longitudinal flow passageway 71 and one or more sets of interior lands 72 and grooves 73. The sets of interior lands 72 and grooves 73 may be any design of land or groove familiar to those skilled in the art and, as shown in FIG. 7, may be helically-cut and threadlike in construction. They may also alternate in the direction of their spiral as shown in FIG. 7 or may be cut in the inside diameter of third mandrel means 70 in only one direction. Third mandrel means 70 is connected to side pocket mandrel body 40 by lower agitation means thread 36 which mates with upper side pocket mandrel body thread 31. Upper agitation means thread 37 is the means for connecting the other end of the third mandrel means 70 to the source of pressurized steam.

The agitation means 23 amalgamates the hot fluid and vapor in preparation for entering the impingement means 22 where the steam is further blended. As steam enters the third longitudinal flow passageway 62, the laminae of hot fluid and vapor are agitated by the lands 72 and the grooves 73 by turbulence and also by the rnating direction of flow caused by the reversed ection of the spiral formed by the lands 72 and oves 73. The amalgamated steam then flows through first longitudinal flow passageway 41 and on to the ingement means 22 as described above. The third ndrel means 70 may also be designed to provide dance of tools through the side pocket mandrel 20 l especially through impingement means 22.

Figure 11:
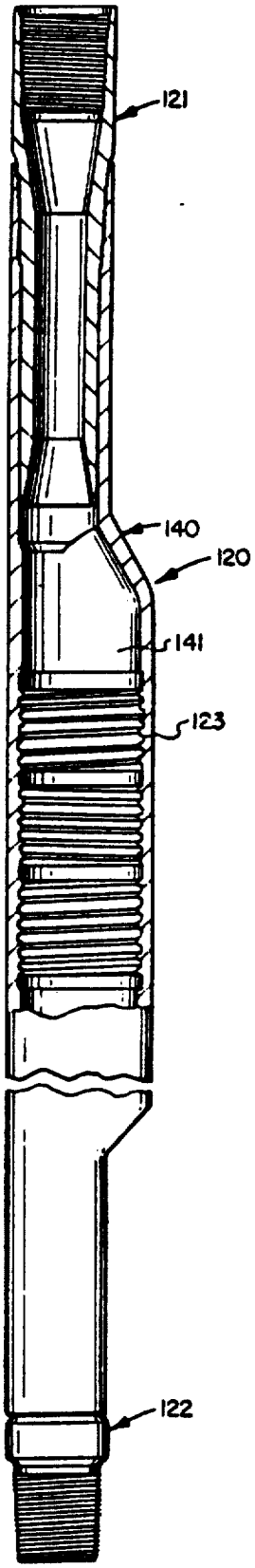
FIG. 11 is a longitudinal view, partly in section and partly in elevation, showing an alternative embodiment of the invention with an agitation means placed in the belly of the side pocket mandrel.

An alternative embodiment of side pocket mandrel 20 ide pocket mandrel 120 shown in FIG. 11. The flow l blending of steam to be provided to the formation is omplished in much the same manner as the other bodiment except that the agitation means 121 is lo- ed lower in first longitudinal flow passageway 141 n the agitation means 23 was in first longitudinal w passageway 41 shown in FIG. 7. This embodiment ows centralizer means 121, which is identical to cen- lizer means 21, to be utilized with agitation means . Centralizer means 123 is attached to side pocket ndrel body 140 in the same manner as described for tralizer means 23 in side pocket mandrel body 40. is combination of centralizer means 121 and agitation ans 123 allows the user to enhance the mixing and nding of the steam if considered necessary to provide selected or calculated quality or percentage of hot id and vapor to the formation. Impingement means 2 is identical to impingement means 22 and is attached side pocket mandrel body 140 in the same manner as scribed for agitation means 22 in side pocket mandrel dy 40.

The foregoing descriptions and drawings of the in- ntion are explanatory and illustrative only, and vari- s changes in shapes, sizes and arrangements of parts well as certain details of the illustrated construction y be made within the scope of the appended claims thout departing from the true spirit of the invention.

We claim:

1. A side pocket mandrel with a first longitudinal w passageway extending therethrough and a valve cket offset therefrom for distribution of steam com- ising:

a. means for connecting one end of the side pocket mandrel to a source of pressurized steam;
b. means for connecting the other end of the side pocket mandrel to other downhole well equipment;
c. impingement means within the first longitudinal flow passageway to mix and direct the steam flow through the first longitudinal flow passageway;
d. fourth port means for communication of steam from the first longitudinal flow passageway to the valve pocket;
e. valve means in the valve pocket to control the flow of the steam from the fourth port means; and
f. first port means in the side pocket mandrel for communication of steam from the valve means to the exterior of the side pocket mandrel.

2. A side pocket mandrel with a first longitudinal ow passageway extending therethrough and a valve ocket communicating with and offset therefrom for stribution of steam comprising:

a. means for connecting one end of the side pocket mandrel to a source of pressurized steam;
b. means for connecting the other end of the side pocket mandrel to other downhole well equipment;
c. centralizer means within the first longitudinal flow passageway to guide tools through the side pocket mandrel and to cause a pressure change and dispersion of the steam;
d. impingement means within the first longitudinal flow passageway to mix and direct the steam flow through the first longitudinal flow passageway;
e. fourth port means for communication of steam from the first longitudinal flow passageway to the valve pocket;
f. valve means in the valve pocket to control the flow of the steam from the fourth port means; and
g. first port means in the side pocket mandrel for communication of steam from the valve means to the exterior of the side pocket mandrel.

3. A side pocket mandrel with a first longitudinal flow passageway extending therethrough and a valve pocket offset therefrom for distribution of steam comprising:

a. means for connecting one end of the side pocket mandrel to a source of pressurized steam;
b. means for connecting the other end of the side pocket mandrel to other downhole well equipment;
c. agitation means within the first longitudinal flow passageway to amalgamate the steam;
d. impingement means within the first longitudinal flow passageway to mix and direct the steam flow; through the first longitudinal flow passageway
e. fourth port means for communication of steam from the first longitudinal flow passageway to the valve pocket;
f. valve means in the valve pocket to control the flow of the steam from the fourth port means; and
g. first port means in the side pocket mandrel for communication of steam from the valve means to the exterior of the side pocket mandrel.

4. A side pocket mandrel as described in claims 1, 2 or 3 wherein the valve means further comprises:

a. latch means;
b. choke means;
c. means for controlling direction of steam flow; and
d. sealing means.

5. A side pocket mandrel as described in claims 1, 2 or 3 wherein the impingement means further comprises:

a. first mandrel means having a second longitudinal flow passageway therethrough;
b. helical directing means for mixing and directing the steam toward the valve means;
c. second port means to allow communication between the second longitudinal flow passageway and the first longitudinal flow passageway;
d. longitudinal directing means to divide the steam flow proportionately between the second longitudinal flow passageway and the first longitudinal flow passageway;
e. means for connecting one end of the first mandrel means to the side pocket mandrel; and
f. means for connecting the other end of the first mandrel means to other downhole well equipment.

6. A side pocket mandrel as described in claim 5 wherein the helical directing means further comprises:

a. spirally cut lands and grooves formed on the outside diameter of the first mandrel means; and
b. chamber means formed between the outside diameter and the inside diameter of the first longitudinal flow passageway.

7. A side pocket mandrel as described in claim 5 wherein the longitudinal directing means further comprises:

a. alternating fingers and slots on one end of the first mandrel means to divide steam flow between the first longitudinal flow passageway and the second longitudinal flow passageway; and b. third port means for draining steam from the chamber formed between the wall of the first longitudinal flow passageway and the outer surface of the first mandrel means.

8. A side pocket mandrel as described in claim 5 wherein the second port means further comprises the first mandrel means having one or more holes allowing communication between the inside diameter and the outside diameter of the first mandrel means.

9. A side pocket mandrel as described in claim 2 wherein the centralizer means further comprises:

a. second mandrel means having a third longitudinal flow passageway therethrough;

b. means for connecting one end of the second mandrel means to the side pocket mandrel;

c. venturi means for guidance of tools through the side pocket mandrel and to cause a pressure change and dispersion of the steam; and d. means for connecting the other end of the second mandrel means to a source of pressurized steam.

10. A side pocket mandrel as described in claim 3 wherein the agitation means further comprises:

a. third mandrel means with a fourth longitudinal passageway therethrough;

b. one or more sets of interior lands and grooves within the fourth longitudinal flow passageway;

c. means for connecting one end of the third mandrel means to the side pocket mandrel; and d. means for connecting the other end of the third mandrel means to the source of pressurized steam.

11. A side pocket mandrel is described in claim 10 wherein the agitation means further comprises means for guidance of tools through the side pocket mandrel.

12. A side pocket mandrel as described in claim 3 wherein agitation means further comprises: one or more sets of interior lands and grooves within the first longitudinal flow passageway.

13. An impingement device for distribution of steam comprising:

a. mandrel means having a longitudinal flow passageway therethrough;

b. helical directing means for mixing and directing the steam;

c. first port means to allow communication between the longitudinal flow passageway and an outside diameter of the mandrel means;

d. longitudinal directing means to divide the steam flow proportionately between the longitudinal flow passageway and outside diameter of the mandrel means; and e. means for connecting the mandrel means to a downhole tool.

14. An impingement device as described in claim 13 wherein the helical directing means further comprises:

a. spirally cut lands and grooves formed on the outside diameter of the mandrel means; and b. second port means for draining steam from the outside diameter of the mandrel means into the longitudinal flow passageway.

15. An impingement device as described in claim 13 wherein the longitudinal directing means further comprises alternating fingers and slots on one end of the mandrel means to divide steam flow between the outside diameter of the mandrel means and the longitudinal flow passageway.

16. An impingement device as described in claim 13 wherein the first port means further comprises the mandrel means having one or more holes allowing communication between the inside diameter and the outside diameter of the mandrel means.

17. A side pocket mandrel with a first longitudinal flow passageway extending therethrough and a valve pocket offset therefrom for distribution of steam comprising:

a. means for connecting one end of the side pocket mandrel to a source of pressurized steam;

b. means for connecting the other end of the side pocket mandrel to other downhole well equipment;

c. impingement means within the first longitudinal flow passageway to mix and direct the steam flow through the first longitudinal flow passageway comprising:

first mandrel means having a second longitudinal flow passageway therethrough;

helical directing means for mixing and directing the steam toward the valve means;

second port means to allow communication between the second longitudinal flow passageway and the first longitudinal flow passageway;

longitudinal directing means to divide the steam flow proportionally between the second longitudinal flow passageway and the first longitudinal flow passageway;

means for connecting one end of the first mandrel means to the side pocket mandrel; and means for connecting the other end of the first mandrel means to other downhole well equipment;

d. fourth port means for communication of steam from the first longitudinal flow passageway to the valve pocket;

e. valve means in the valve pocket to control the flow of the steam from the fourth port means; and f. first port means in the side pocket mandrel for communication of steam from the valve means to the exterior of the side pocket mandrel.

18. A side pocket mandrel with a first longitudinal flow passageway extending therethrough and a valve pocket offset therefrom for distribution of steam comprising:

a. means for connecting one end of the side pocket mandrel to a source of pressurized steam;

b. means for connecting the other end of the side pocket mandrel to other downhole well equipment;

c. agitation means within the first longitudinal flow passageway to amalgamate the steam comprising:

third mandrel means with a fourth longitudinal flow passage therethrough;

one or more sets of interior lands and grooves within the fourth longitudinal flow passageway;

means for connecting one end of the third mandrel means to the side pocket mandrel; and means for connecting the other end of the third mandrel means to the source of pressurized steam;

d. impingement means within the first longitudinal flow passageway to mix and direct the steam flow through the first longitudinal flow passageway;

e. fourth port means for communication of steam from the first longitudinal flow passageway to the valve pocket;

f. valve means in the valve pocket to control the flow of the steam from the fourth port means; and . first port means in the side pocket mandrel for communication of steam from the valve means to the exterior of the side pocket mandrel.

9. An impingement device for distribution of steam nprising:

ı. mandrel means having a longitudinal flow passageway therethrough;

). helical directing means for mixing and directing the steam comprising:

spirally cut lands and grooves formed on the outside diameter of the mandrel means; and second port means for draining steam from the outside diameter of the mandrel means into the longitudinal flow passageway;

c. first port means to allow communication between the longitudinal flow passageway and an outer diameter of the mandrel means;

d. longitudinal directing means to divide the steam flow proportionally between the longitudinal flow passageway and outside diameter of the mandrel means; and e. means for connecting the mandrel means to a downhole tool.

20. A side pocket mandrel with a first longitudinal ɔw passageway extending therethrough and a valve ɔcket communicating with an off set therefrom for a stribution of steam comprising:

a. means for connecting one end of the side pocket mandrel to a source of pressurized steam;

b. means for connecting the other end of the side pocket mandrel to other downhole well equipment;

c. centralizer means within the first longitudinal flow passageway to guide tools through the side pocket mandrel and to cause a pressure change and dispersion of the steam;

d. impingement means within the first longitudinal flow passageway to mix and direct the steam flow through the first longitudinal flow passageway comprising:

first mandrel means having a second longitudinal flow passageway therethrough;

helical directing means for mixing and directing the steam toward the valve means;

second port means to allow communication between the second longitudinal flow passageway and the first longitudinal flow passageway;

longitudinal directing means to divide the steam flow proportionally between the second longitudinal flow passageway and the first longitudinal flow passageway;

means for connecting one end of the first mandrel means to the side pocket mandrel; and means for connecting the other end of the first mandrel means to other downhole well equipment;

e. fourth port means for communication of steam from the first longitudinal flow passageway to the valve pocket;

f. valve means in the valve pocket to control the flow of the steam from the fourth port means; and g. first port means in the side pocket mandrel for communication of steam from the valve means to the exterior of the side pocket mandrel.

21. A side pocket mandrel with a first longitudinal flow passageway extending therethrough and a valve pocket offset therethrough for distribution of steam comprising:

a. means for connecting one end of the side pocket mandrel to a source of pressurized steam;

b. means for connecting the other end of the side pocket mandrel to other downhole well equipment;

c. agitation means within the first longitudinal flow passageway to amalgamate to steam;

d. impingement means within the first longitudinal flow Passageway to mix and direct the steam flow through the first longitudinal flow passageway comprising:

first mandrel means having a second longitudinal flow passageway therethrough;

helical directing means for mixing and directing the steam toward the value means;

second port means to allow communication between the second longitudinal flow passageway and the first longitudinal flow passageway;

longitudinal directing means to divide the steam flow proportionally between the second longitudinal flow passageway and the first longitudinal flow passageway;

means for connecting one end of the first mandrel means to the side pocket mandrel; and means for connecting the other end of the first mandrel means to other downhole well equipment;

e. fourth port means for communication of steam from the first longitudinal flow passageway to the valve pocket;

f. valve means in the valve pocket to control the flow of the steam from the fourth port means; and g. first port means in the side pocket mandrel for communication of steam from the valve means to the exterior of the side pocket mandrel.

*22. A side pocket mandrel with a first longitudinal flow passageway extending therethrough and a valve pocket offset therefrom for distribution of steam comprising:*

*a. means for connecting one end of the side pocket mandrel to a source of pressurized steam;*

*b. means for connecting the other end of the side pocket mandrel to other downhole well equipment;*

*c. means to divide the steam flow between the valve pocket and the first longitudinal flow passageway;*

*d. fourth port means for communication of steam from the first longitudinal flow passageway to the valve pocket; and*

*e. valve means in the valve pocket to control the flow of the steam from the fourth port means and for communication of steam from the valve means to the exterior of the side pocket mandrel.*

*23. The side pocket mandrel of claim 22 wherein the valve means includes a venturi means.*

*24. The side pocket mandrel of claim 22 wherein the valve means includes a venturi means and steam emits from the side pocket after having been accelerated to its critical flow rate.*

*25. A side pocket mandrel with a first longitudinal flow passageway extending therethrough and a valve pocket communicating with and offset therefrom for distribution of steam comprising:*

*a. means for connecting one end of the side pocket mandrel to a source of pressurized steam;*

*b. means for connecting the other end of the side pocket mandrel to other downhole well equipment;*

*c. venturi means between said valve pocket and source of pressurized steam to cause a pressure change and dispersion of the steam;* d. fourth port means for communication of steam from the first longitudinal flow passageway to the valve pocket; and e. valve means in the valve pocket to control the flow of the steam from the fourth port means and for communication of steam from the valve means to the exterior of the side pocket mandrel.

26. The side pocket mandrel of claim 25 wherein the valve means includes a venturi means.

27. A method of injecting steam at a selected mass flow rate into a production formation of a subterranean well having a tubing string traversing the production formation comprising the steps of:

supplying a steam flow to the surface end of the tubing string;

diverting the downwardly flowing steam into the radially separated flow components above and adjacent to the production formation;

directing one of said flow components into the inlet end of a Venturi passage, the outlet end of the Venturi passage being in communication with the production formation; and accelerating the flow rate of said one flow component by said Venturi passage to its critical mass flow rate.

28. The method of claim 27 wherein the radially outer steam flow component is directed to a Venturi flow passage disposed on the exterior of the tubing string.

29. The method of claim 27 wherein each radially outer steam flow component is directed to a respective Venturi flow passage disposed on the exterior of tubing string and each radially inner steam flow component continues down the tubing string to the next production formation.

30. A method of injecting steam at selected mass flow rates into a plurality of vertically spaced production formations traversed by a single steam carrying tubing string, comprising the steps of:

supplying a steam flow to the surface end of the tubing string;

diverting the downwardly flowing steam into two radially separated flow components above and adjacent to each of the production formations;

directing one of each said two flow components into the inlet end of a Venturi passage, the outlet end of the Venturi passage being in communication with a respective production formation; and accelerating the flow rate of each said one flow component by said respective Venturi passage to its critical mass flow rate; and directing the other of each said flow components downwardly through the tubing string to the next lower production formation.

31. Apparatus for injecting steam into a production formation of a subterranean well at a selected mass flow rate comprising a tubular housing connectable in series relationship to the tubing string adjacent the production formation; fluid diverting means in said tubular housing for dividing the steam flow into two radially separated components; and means including a Venturi passage for accelerating the flow rate of one said flow component to the critical mass flow rate and directing the accelerated component to the production formation.

32. Apparatus for injecting steam at selected mass flow rates into a plurality of vertically spaced production formations through a single tubing string traversing said formations comprising: a plurality of tubular housings connected in series relationship to the tubing string and respectively positioned adjacent said production formations; fluid diverting means in each said tubular housing adjacent each production formation for dividing the steam flow into two radially separated components; and means including a Venturi passage for accelerating the flow rate of one said flow component to its critical mass flow rate and directing the accelerated component to the respective production formation, whereby said other flow component flows downwardly to the next lower tubular housing.

33. The apparatus of claim 31 or 32 wherein said Venturi passage is disposed exteriorly of said tubular housing.

34. Apparatus for injecting steam at a selected mass flow rate into a production formation of a subterranean well from a tubing string extending to the surface comprising: a tubular housing connectable in series relationship to the tubing string adjacent the production formation means in said tubular housing for diverting a portion of the steam flow down the tubing string to the outer peripheral wall of said tubular housing; said outer peripheral wall having a port opening therethrough; a secondary housing secured to the said exterior of tubular housing adjacent said port opening, said secondary housing defining an inlet chamber communicating with said port openings; and a downwardly directed Venturi passageway to discharge a portion of the high-velocity steam flow into an adjacent production formation.

35. The apparatus of claims 31, 32, or 34 wherein each said Venturi passage is proportioned to accelerate the steam to critical mass flow rate to deliver steam to the adjacent production formation at a selected mass flow rate.

36. The apparatus of claims 31, 32, or 34 further comprising stationary fluid mixing means disposed in the upper portion of said tubular housing above said fluid diverting means for producing a homogeneous mixture of steam vapor and liquid.

37. A method of injecting steam at a selected mass flow rate into a production formation of a subterranean well having a tubing string traversing the production formation comprising the steps of:

supplying a steam flow to the surface end of the tubing string;

diverting the downwardly flowing steam into two radially separated flow components adjacent to the production formation;

directing one of said flow components into the inlet end of a Venturi passage, the outlet end of the Venturi passage being in communication with the production formation; and accelerating the flow rate of said one flow component by said Venturi passage.

38. The method of claim 37 wherein the radially outer steam flow component is directed to a Venturi flow passage disposed on the exterior of the tubing string.

39. The method of claim 37 wherein each radially outer steam flow component is directed to a respective Venturi flow passage disposed on the exterior of tubing string and each radially inner steam flow component continues down the tubing string to the next production formation.

40. A method of injecting steam at selected mass flow rates into a plurality of vertically spaced production formations traversed by a single steam carrying tubing string, comprising the steps of:

supplying a steam flow to the surface end of the tubing string;

diverting the downwardly flowing steam into two radially separated flow components adjacent to each of the production formations;

directing one of each said two flow components into the inlet end of a Venturi passage, the outlet end of the Venturi passage being in communication with a respective production formation; and accelerating the

*flow rate of each said one flow component by said respective Venturi passage; and*

*directing the other of each said flow components downwardly through the tubing string to the next lower production formation.*

*41. Apparatus for injecting steam into a production rmation of a subterranean well at a selected mass flow te comprising a tubular housing connectable in series lationship to the tubing string adjacent the production rmation; fluid diverting means in said tubular housing r dividing the steam flow into two radially separated mponents; and means including a Venturi passage for celerating the flow rate of one said flow component and recting the accelerated component to the production rmation.*

*42. Apparatus for injecting steam at selected mass flow tes into a plurality of vertically spaced production formaons through a single tubing string traversing said formaons comprising: a plurality of tubular housings connected series relationship to the tubing string and respectively sitioned adjacent said production formations; fluid dirting means in each said tubular housing adjacent each oduction formation for dividing the steam flow into two dially separated components; and means including a enturi passage for accelerating the flow rate of one said ow component and directing the accelerated component the respective production formation, whereby said other ow component flows downwardly to the next lower tubur housing.*

*43. The apparatus of claim 41 or 42 wherein said Venri passage is disposed exteriorly of said tubular housing.*

*44. The apparatus of claims 41 or 42 further comprising ationary fluid mixing means disposed in the upper porn of said tubular housing above said fluid diverting eans for producing a homogeneous mixture of steam apor and liquid.*

*45. The method of claims 27, 30, 37, or 40 further comrising the step of delivering steam at a selected mass flow ate by passing the steam through a Venturi passage prior diverting the downwardly flowing steam into two radially parated flow components.*

*46. The method of claims 27, 30, 37, or 40 further comrising the step of passing the steam through a Venturi assage prior to diverting the downwardly flowing steam nto two radially separated flow components.*

*47. Apparatus for injecting steam at a selected mass flow ate into a production formation of a subterranean well omprising a tubing string extending into the well to a roduction formation, a source of high pressure steam, a ubular housing connectable in series relationship to the ubing string adjacent the production formation, fluid liverting means in said tubular housing for dividing the team flow into two radially separated components, means ncluding a Venturi passage for accelerating the flow rate f one of said flow components and directing the accelerted flow component to the production formation, and neans between said source of steam and said tubular housng defining a Venturi passage for the steam to accelerate ame to its critical mass flow rate.*

*48. Apparatus for injecting steam at a selected mass flow ate into a production formation of a subterranean well omprising a tubing string extending into the well to a roduction formation, a source of high pressure steam, a ubular housing connectable in series relationship to the ubing string adjacent the production formation, fluid liverting means in said tubular housing for dividing the team flow into two radially separated components, means ncluding a Venturi passage for accelerating the flow rate of one of said flow components and directing the accelerated flow component to the production formation, and means between said source of steam and said tubular housing defining a Venturi passage for the steam to accelerate same.*

*49. Apparatus for injecting steam at selected mass flow rates into a plurality of vertically spaced production formations of a subterranean well comprising, a tubing string extending into the well to said production formations, a source of high pressure steam connecting said source to said tubing, a plurality of tubular housings connected in series relationship to the tubing string and respectively positioned adjacent said production formations, fluid diverting means in each said tubular housing for dividing the steam flow into two radially separated components, means including a Venturi passage for accelerating the flow rate of one of said flow components and directing the accelerated component to the respective production formation, whereby said other flow component flows downwardly to the next lower tubular housing, and means between said source of steam and the upper of said plurality of tubular housings defining a Venturi passage for the steam to accelerate same to its critical mass flow rate.*

*50. Apparatus for injecting steam at selected mass flow rates into a plurality of vertically spaced production formations of a subterranean well comprising, a tubing string extending into the well to said production formations, a source of high pressure steam connecting said source to said tubing, a plurality of tubular housings connected in series relationship to the tubing string and respectively positioned adjacent said production formations, fluid diverting means in each said tubular housing for dividing the steam flow into two radially separated components, means including a Venturi passage for accelerating the flow rate of one of said flow components and directing the accelerated component to the respective production formation, whereby said other flow component flows downwardly to the next lower tubular housing, and means between said source of steam and the upper of said plurality of tubular housing defining a Venturi passage for the steam to accelerate same.*

*51. Apparatus for injecting steam selected mass flow rate into a projection formation of a subterranean well comprising, a tubing string extending into the well to a production formation, a source of high pressure steam, a tubular housing connectable in series relationship to the tubing string, means in said tubular housing for diverting a portion of the steam flow down the tubing string to the outer peripheral wall of said tubular housing, said outer peripheral wall having a port opening therethrough, a second housing secured to the exterior of said tubular housing adjacent said port opening, said secondary housing defining an inlet chamber communicating with said port opening and a downwardly directed Venturi passageway to discharge a portion of the steam flow into an adjacent production formation, and means between said source of steam and said tubular housing defining a Venturi passage for the steam to accelerate same to its critical mass flow rate.*

*52. Apparatus for injecting steam at selected mass flow rate into a production formation of a subterranean well comprising, a tubing string extending into the well to a production formation, a source of high pressure steam, a tubular housing connectable in series relationship to the tubing string, means in said tubular housing for diverting a portion of the steam flow down the tubing string to the outer peripheral wall of said tubular housing, said outer peripheral wall having a port opening therethrough, a second housing secured to the exterior of said tubular housing adjacent said port opening, said secondary housing defin-*

*ing an inlet chamber communicating with said port opening and a downwardly directed Venturi passageway to discharge a portion of the steam flow into an adjacent production formation, and means between said source of steam and said tubular housing defining a Venturi passage for the steam to accelerate same.*

*53. The apparatus of claims 47, 48, 49, 50, 51, or 52 wherein each said Venturi passage is proportioned to deliver steam to the adjacent production formation at a selected mass flow rate.*

*54. The apparatus of claims 47, 48, 49, 50, 51, or 52 further comprising stationary fluid mixing means disposed in the upper portion of each said tubular housing above said fluid diverting means for producing a homogeneous mixture of steam, vapor, and liquid.*

*55. A method of injecting steam at a selected mass flow rate into a production formation of a subterranean well having a tubing string traversing the production formation comprising the steps of:*

*supplying a steam flow to the surface end of the tubing string;*

*diverting the downwardly flowing steam into two radially separated flow components within the tubing;*

*directing one of said flow components into the inlet end of a choke passage, the outlet end of the choke passage being in communication with the production formation; and*

*accelerating the flow rate of said one flow component by said choke passage to a selected mass flow rate.*

*56. Apparatus for injecting steam into a production formation of a subterranean well at a selected mass flow rate comprising a tubular housing connectable in series relationship to the tubing string;*

*fluid diverting means in said tubular housing for dividing the steam flow into two radially separated components; and*

*means including a choke passage for accelerating the flow rate of one said flow component.*

*57. Apparatus for injecting steam at a selected mass flow rate into a production formation of a subterranean well from a tubing string extending to the surface comprising:*

*a tubular housing connectable in series relationship to the tubing string;*

*means in said tubular housing for diverting a portion of the steam flow down the tubing string to the outer peripheral wall of said tubular housing;*

*said outer peripheral wall having a port opening therethrough;*

*a secondary housing secured to the said exterior of tubular housing adjacent said port opening, said secondary housing defining an inlet chamber communicating with said port opening; and*

*a downwardly directed choke passageway to discharge a portion of the high-velocity steam flow.*

*58. Apparatus for injecting steam at a selected mass flow rate into a production formation of a subterranean well comprising:*

*a tubing string extending into the well to a production formation;*

*a source of high pressure steam connected to the tubing;*

*a tubular housing connectable in series relationship to the tubing string adjacent the production formation;*

*fluid diverting means in said tubular housing for dividing the steam flow into two radially separated components;*

*means including a choke passage for accelerating the flow rate of one said flow component and directing the accelerated component to the production formation; and*

*means defining a choke passage between the source of high pressure steam and said tubular housing to accelerate said steam.*

* * * * *